June 10, 1930.  J. F. PRIBNOW  1,763,065
SAW TOOTH GRINDER
Filed April 18, 1927   3 Sheets-Sheet 1

Inventor
JOHN F. PRIBNOW,
By Ashley & Frank
Attorney

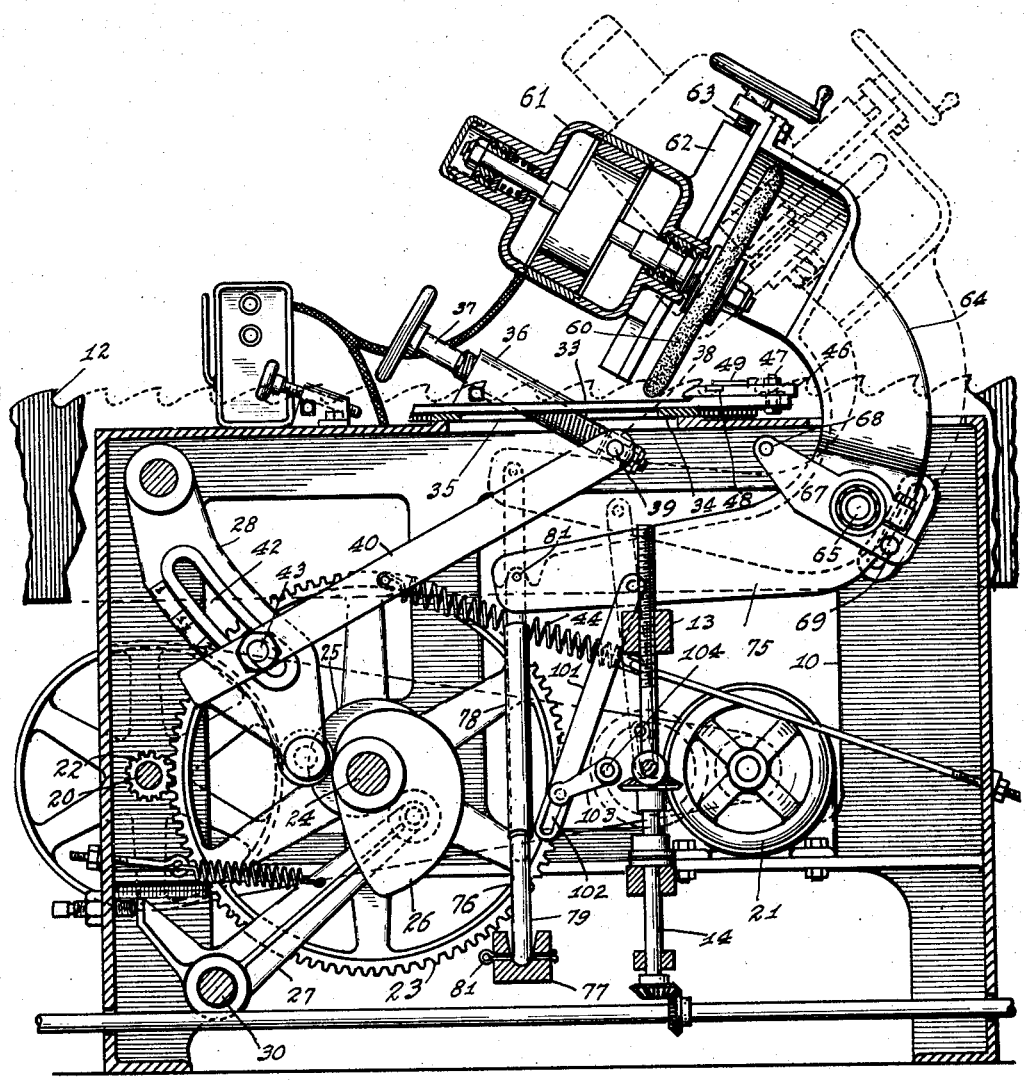

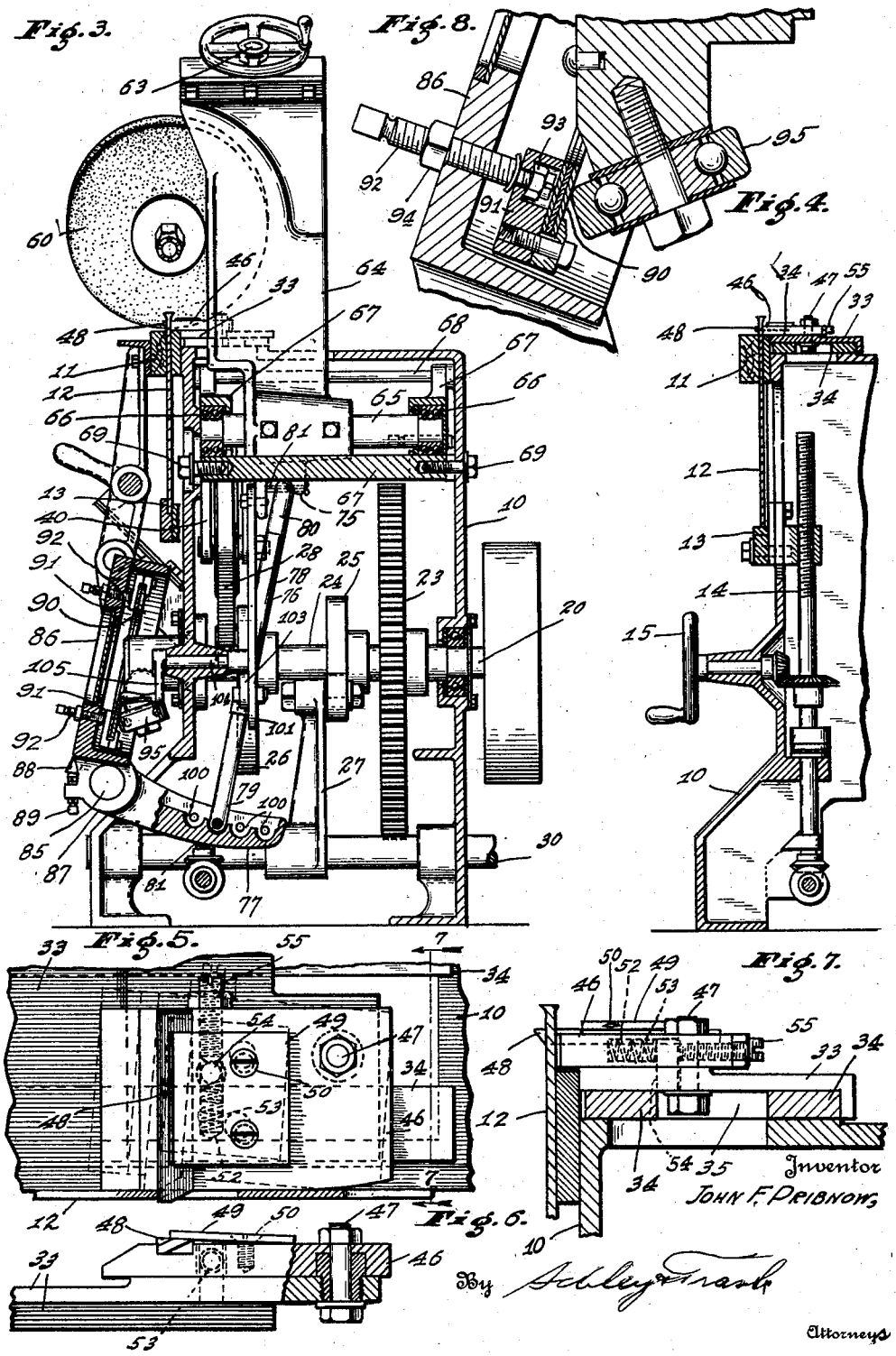

Patented June 10, 1930

1,763,065

UNITED STATES PATENT OFFICE

JOHN F. PRIBNOW, OF SAN DIEGO, CALIFORNIA, ASSIGNOR TO PRIBNOW SAW SHARPENING MACHINERY COMPANY, OF LOS ANGELES, CALIFORNIA, A CORPORATION OF CALIFORNIA

SAW-TOOTH GRINDER

Application filed April 18, 1927. Serial No. 184,522.

It is the object of my invention to produce an automatic machine adaptable to be used in the sharpening of saws, particularly band saws. More specifically, it is my object to improve the construction of the saw sharpening machine illustrated in my previous Patent No. 1,551,054, issued August 25, 1925. By my improved construction, I make it possible to vary the pitch or inclination of the cutting edges of the saw teeth, I facilitate adjustment of the machine to provide for different heights of teeth, and I also facilitate adjustment of the feeding mechanism.

I accomplish the above objects by mounting the emery wheel of my sharpener on a rocking arm, the axis of pivotal mounting of which may be adjusted to different positions to vary the pitch of the saw teeth. I provide a throw-out mechanism which operates directly on this arm to take the load off the arm-rocking means, and thus to facilitate adjustment thereof to accommodate the device to different heights of saw teeth.

Figure 1:
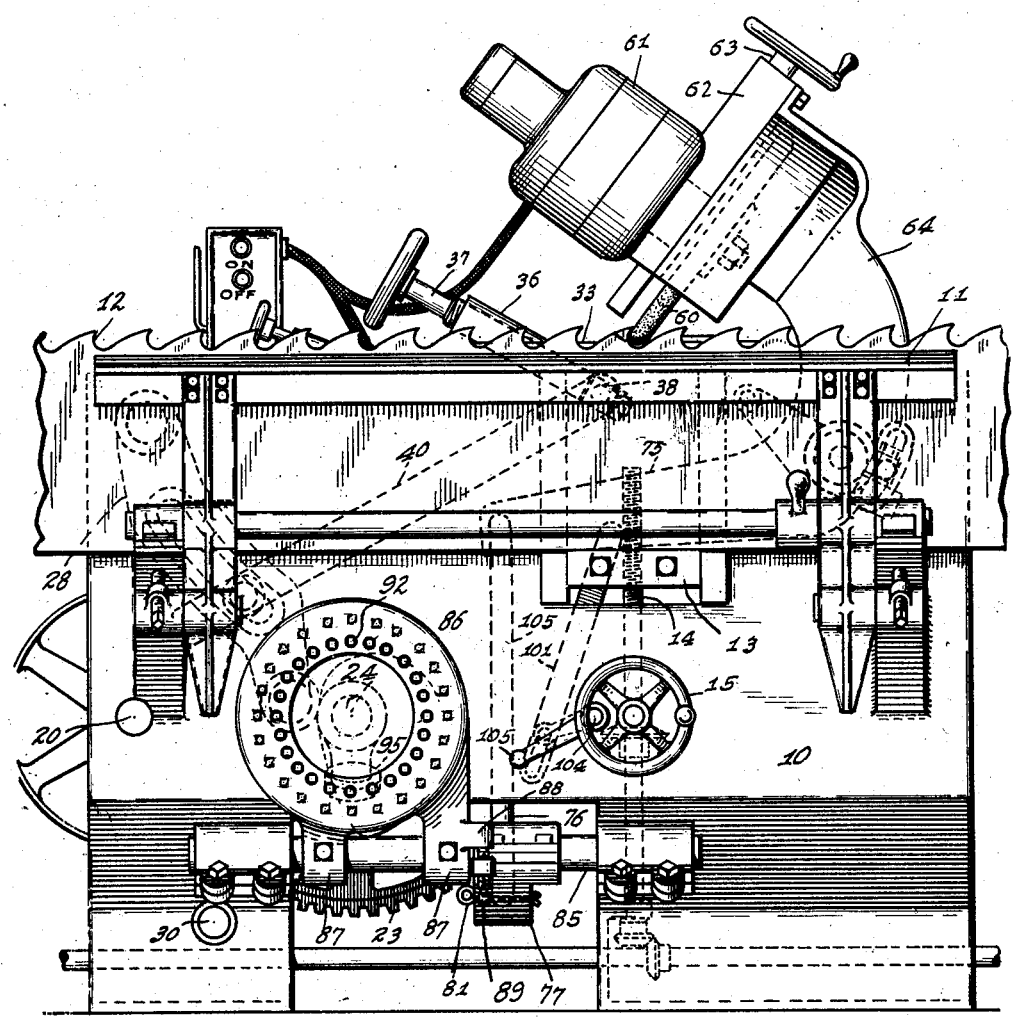
Figure 10:
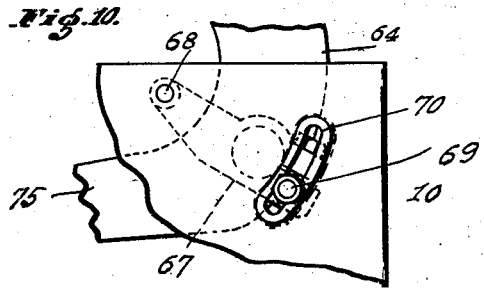

The accompanying drawings illustrate my invention: Fig. 1 is a front elevation of the saw grinding machine showing a fragment of the band saw; Fig. 2 is a vertical section through the machine in a plane parallel to the front thereof; Fig. 3 is a transverse vertical section through the machine; Fig. 4 is also a transverse vertical section, but in a different plane, to show the means I employ for adjusting the height of the band saw; Fig. 5 is a fragmental plan view of the saw-feeding block; Fig. 6 is a front elevation of such feeding block; Fig. 7 is a vertical section on the line 7—7 of Fig. 5; Figs. 8 and 9 are detail views of the face cam and its support; and Fig. 10 is a fragmental front elevation illustrating the means employed for adjusting the pivot of the rocking arm which carries the emery wheel.

My machine comprises a frame 10 on the front face of which is mounted a suitable spring-pressed clamp-bar 11 which holds the band saw 12 against the front face of the frame. For the purpose of vertically adjusting the saw 12, its lower edge rests on a vertically sliding block 13 which may be vertically adjusted by means of the screw 14 and hand wheel 15. This mechanism is well known, and need not be described in detail here.

Extending horizontally transversely of the frame is a shaft 20 adapted to be driven from an electric motor 21. Rotatable with the shaft 20 is a pinion 22 which meshes with a gear 23 carried by a second shaft 24. The shaft 24 carries a back-feed cam 25 and a front feed-cam 26 which serves respectively to operate the back-feed rock-arm 27 and the front-feed rock-arm 28. The back-feed rock-arm 27 is rigid with a shaft 30 which extends transversely of the frame 10 and beyond such frame to feed the back stretch of the band saw 12. My invention is not concerned with details of this back-feed.

Mounted on the top of the frame 10 is a horizontally slidable feed-plate 33 sliding on suitable ways 34 which are spaced apart transversely of the machine to provide a slot 35. In line with the slot 35, the plate 33 is provided with a boss 36 having an inclined screw-threaded hole for the reception of an adjusting screw 37. Below the plate 33, there is mounted on this adjusting screw 37 a nut 38 pivotally connected as by a pin 39 to a link 40 which is in turn connected to the rock-arm 28.

Preferably the interconnection of the rock-arm 28 and the link 40 is adjustable to vary the distance through which the plate 33 reciprocates. To this end, the arm 28 may be provided with a slot 42 through which passes a pivot bolt 43 by means of which the link 40 is secured to the arm. The position of the bolt 43 in the slot 42 may be varied to change the distance through which the plate 33 reciprocates. A spring 44, acting between the link 40 and any convenient fixed point serves to hold the feed arm 28 in engagement with its operating cam 26 and also serves to force the feed plate 33 downward against the ways 34.

The feed-plate 33 carries a feed block 46 which is pivotaly attached to the feed-plate as by means of a pivot bolt 47. A feed-finger 48 is mounted in a transverse groove in the upper surface of the feed block 46 and is held in place in such groove by a clamp plate 49 which may be drawn downward by means of screws 50. Extending transversely of the feed block 46 is a hole or groove 52 adapted to receive a coiled spring 53 which operates between the feed block 46 and a pin 54 rigid with the plate 33 to force the feed block 46 toward the saw 12 with the end of the feed-finger 48 projecting into the plane of the saw. An adjusting screw 55 is mounted in the side of the block 46 in position to engage the pin 54 to limit outward movement of the block 46 under the influence of the spring 53.

From the above description, it will be evident that as the feed plate moves to the right (Figs. 1 and 2) the projecting end of the feed-finger 48 will engage one of the teeth of the saw 12 and will cause the feed block 46 to swing about the axis of the bolt 47 to permit the feed finger to pass this saw tooth. Movement of the saw is at this time prevented by reason of the pressure exerted on it by the clamp-bar 11. When the plate 33 approaches the end of its stroke, the spring 53 forces the feed block 46 outward to cause the end of the feed finger 48 to enter the next space in the saw, and the subsequent leftward movement of the plate 33 causes the saw to be fed forward through a distance equal to the length of one saw tooth. The saw is thus fed, step by step, through the machine.

To grind the teeth of the saw as they pass through the machine, I provide an emery or other grinding wheel 60 which is preferably mounted directly on the armature shaft of an electric motor 61. The motor 61 is mounted on a block 62, the position of which is adjustable, as by means of an adjusting screw 63, relative to a rock arm 64 which carries the motor 61 and wheel 60. The rock arm 64 is rigid with a shaft 65 supported, preferably by anti-friction bearings 66, in a swinging yoke 67. The yoke 67 is pivotally mounted on a rod 68 which extends transversely of the machine, and the yoke 67 may be held in various positions of angular adjustment about the rod 68 by means of a screw 69 which projects through an arcuate slot in the front of the frame 10.

As the saw 12 is fed forward in the machine, the arm 64 is rocked about the axis of the shaft 65 in order that the wheel 60 may grind the saw teeth to the desired form. To this end, the arm 64 has an extension 75, the outer end of which is connected through a link 76 with a rocking lever 77 which is oscillated as the saw passes through the machine. The rod 76 is preferably a telescoping rod comprising an outer tubular portion 78 and an inner part 79 which may slide therein. The tubular portion 78 is provided with a head 80 which limits the distance to which the rod 79 may be forced into the tubular portion 78.

As shown in the drawings, the head 80 is connected to the arm-extension 75 and the inner part 79 of the telescoping rod 76 is connected to the lever 77. The rod can, however, be reversed. The outer ends of the head 80 and telescoping member 79 are desirably made spherical in shape and are received in spherical depressions in the arm 75 and lever 77 respectively. To retain the rod 79 and head 80 in position, cotter pins 81 may be provided. These pins fit loosely in holes in the rod 79 and head 80 and serve merely to hold the rod in place, as the only strain imposed on the rod in operation is compression.

To provide for the oscillation of the lever 77, I employ mechanism somewhat similar to that shown in my prior patent above referred to. The arm 77 is mounted on a longitudinally extending shaft 85 which is mounted on the frame 10 of the machine, and which also carries a ring or plate 86. The ring 86 is provided with extending bosses 87 in which the shaft 85 is received, one of such bosses having an abutment 88 with which there co-operates a set screw 89 carried by the lever 77.

The ring 86 serves as a support for the adjustable face cam described in my prior patent. This face cam comprises a plurality of rings 90 of flexible material such as sheet steel which are superposed and held together in the manner illustrated in my prior patent or by being clamped to blocks 91 as shown in Figs. 8 and 9. I prefer this latter construction as it makes it possible to adjust the shape of the face cam by the use of a single series of adjusting screws 92 which extend through the supporting ring 86 and are rotatably mounted respectively in the blocks 91. Preferably, the screws 92 are held in place in the blocks 91 by means of nuts 93, each of such nuts and its associated blocks being provided with mating spherical surfaces in order that the blocks may assume different angular positions and not interfere with adjustment of the screws 92 to change the shape of the face cam. When the screws 92 are adjusted so that the grinding wheel 60 produces the desired tooth shape, the screws may be locked by means of locknuts 94.

Co-operating with the face cam is a cam-operating roller 95 rotatable with the shaft 24. The cam roller 95 is mounted on an oblique axis so that only one of its edges engages the inner one of the links 90. The exact angular position of the axis of the roller 95 will vary with the diameter of the roller and with its distance from the center of the shaft 24. I prefer to so construct the device that the axis of the roller 95 will intersect the axis of the shaft 24 in the plane of revolution of that edge of the roller which engages the face cam, as I have found that this construction decreases friction and makes for easy operation of the machine.

To provide for different heights of saw teeth, the oscillating lever 77 is provided with a series of spherical depressions 100, any one of which may receive the lower end of the rod 79. I provide a means for lifting the arm 64 to take the strain off the rod 76 and to permit shifting of the lower end of the rod 79 from one of the spherical depressions 100 to another. To this end, I mount on the arm-extension 75 a link 101, the lower end of which is provided with a slot 102 which receives a pin carried by an arm 103. The arm 103 is rigid with a shaft 104 which extends through the front face of the frame 10 and is provided with an operating lever 105. The slot 102 is of such length that it will not interfere with the axial reciprocation of the arm 64 during the normal operation of the machine. When, however, it is desired to raise the arm 64 to change the position of the lower end of the rod 79, the lever 105 is rotated in a clockwise direction to elevate the arm 64. In this operation, the telescoping rod 76 is extended, thus making it possible to shift the position of the lower end of the rod 79 without any great difficulty.

I claim as my invention:—

1. A camming device, comprising a rockshaft, a supporting plate mounted thereon, a flexible cam ring carried by said supporting plate, means acting between said cam ring and said supporting plate for varying the shape of said cam ring, a rotatable shaft, and a roller carried by said rotatable shaft and arranged to travel around said cam ring as said rotatable shaft rotates, said roller being rotatably supported from said rotatable shaft on an oblique axis inclined inwardly and toward said cam ring.

2. A camming device, comprising a rockshaft, a cam ring mounted thereon, a rotatable shaft, and a roller carried by said rotatable shaft and arranged to travel around said cam ring as said rotatable shaft rotates, said roller being rotatably supported from said rotatable shaft on an oblique axis inclined inwardly and toward said cam ring.

3. A camming device, comprising a rockshaft, a supporting plate mounted thereon, a flexible cam ring carried by said supporting plate, a plurality of blocks carried at spaced intervals by said cam ring, a plurality of adjusting screws operatively connected respectively to said blocks and adjustable to alter the shape of said cam ring, a rotatable shaft, and a member carried by said rotatable shaft and arranged to travel around said cam ring as said rotatable shaft rotates.

In witness whereof, I have hereunto set my hand at San Diego, California, this 11th day of April, A. D. one thousand nine hundred and twenty-seven.

JOHN F. PRIBNOW.